Patented Dec. 17, 1929

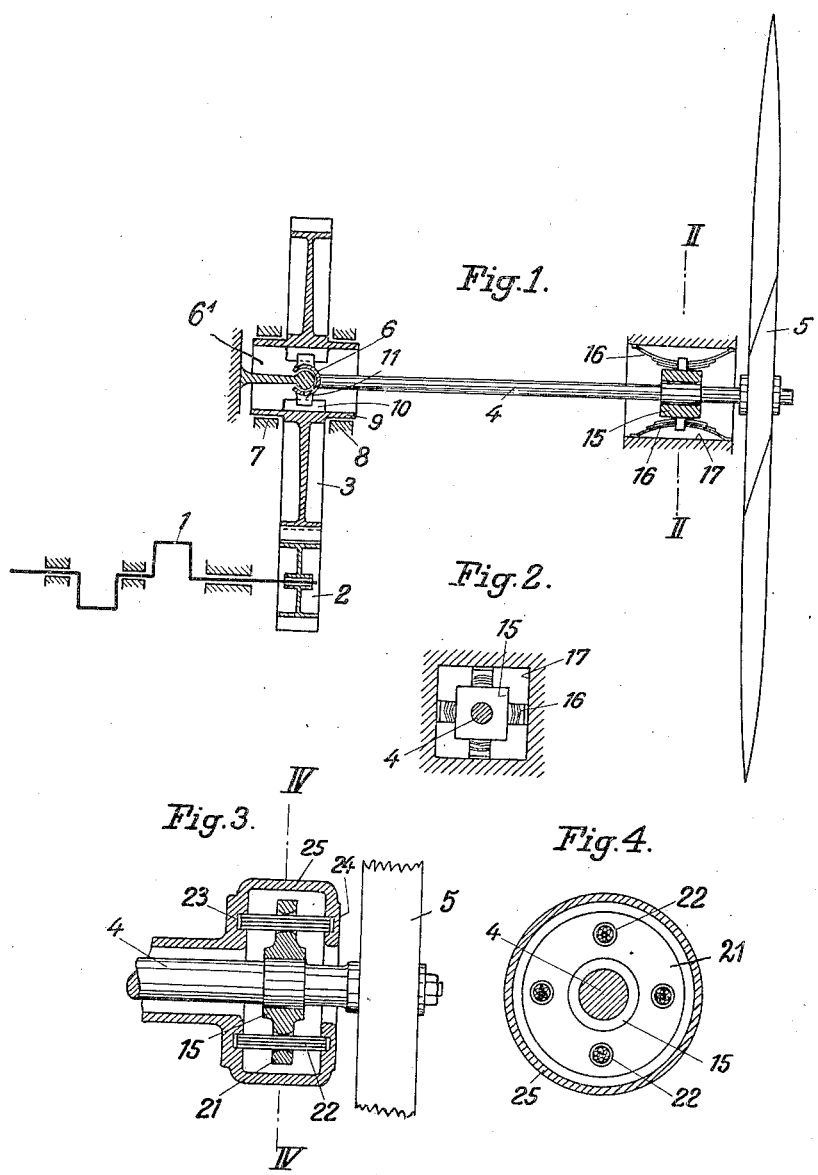

1,740,362

UNITED STATES PATENT OFFICE

OTTO MADER, OF DESSAU, GERMANY, ASSIGNOR TO HUGO JUNKERS, OF DESSAU, GERMANY

PROPELLER-SHAFT SUPPORT

Application filed June 30, 1928, Serial No. 289,528, and in Germany July 18, 1927.

My invention relates to the supporting of propeller shafts, for instance the shafts of aircraft propellers. It is an object of my invention to provide a mode of supporting such propellers, which permits a particularly effective balancing of the propeller and its shaft. To this end I support the propeller shaft at two points, its inner end being supported to permit the shaft to rock about a centre point in all directions, while the propeller end of the shaft is supported resiliently in radial direction.

In high-speed propellers, such as are used in aircraft, perfect balancing is very important in order to prevent straining and vibrating of the craft, or parts thereof, by unbalanced centrifugal forces. Effective balancing is particularly desirable in propellers which are not arranged in immediate vicinity of an engine block or other heavy unit, but are remote from such parts and operated through the medium of gears and shafting, only comparatively light and resilient parts, such as simple struts, being available as supporting means in the immediate vicinity of the propeller. In this case the amplitude of vibrations due to unbalanced centrifugal forces is considerable. It is due to these vibrations which are not only troublesome but may even become dangerous, that the arrangement of the propellers remote from the engines, which is desirable from an aerodynamic point of view, has not been adapted, or abandoned where it had been attempted.

These drawbacks are overcome according to this invention in which the balancing of the propeller is so perfect that the propeller can be arranged without difficulties at points where only light and comparatively resilient parts are available for the support of its shaft. However, the advantages inherent in my invention are not limited to the case of propellers arranged at a point remote from the engine for in the case of a propeller arranged in the immediate vicinity of an engine unit or other weighty mass the often very important stresses on the propeller shaft due to unbalanced centrifugal forces and the load on their bearings are practically eliminated.

By arranging the propeller shaft bearings as described, the shaft is imparted the character of a "free shaft". By this denomination is determined a shaft which, when rotating at high speed, automatically assumes a position in which its centre of gravity coincides exactly with the axis of rotation. Unbalanced centrifugal forces cannot occur with such an arrangement and consequently their detrimental action on bearings and other parts of aircraft is eliminated.

In the drawings affixed to this specification and forming part thereof shaft supports embodying my invention are illustrated diagrammatically by way of example.

In the drawings,

Fig. 1 is a partly sectional elevation and

Fig. 2 is a section on the line II—II in Fig. 1, illustrating the first modification, while Fig. 3 is an axial section on a larger scale, showing a modified bearing for use in the vicinity of the propeller, and Fig. 4 is a section on the line IV—IV in Fig. 3.

Referring first to Figs. 1 and 2, the engine unit is indicated diagrammatically by its crank shaft 1, 2 is a pinion on the end of the crank shaft, 3 is a gear on a hollow shaft 9 meshing with pinion 2, 7 and 8 are bearings for the hollow shaft 9, 4 is the propeller shaft which is connected with the hollow shaft 9, by clutch means 10, 11, and a universal joint 6, having a stationary suport 6', and 5 is the propeller. Any suitable type of bearing may be provided at the inner end of the shaft instead of the ball and socket joint shown, for instance a ball thrust bearing with a spherical race, or any other type of bearing which possesses universal properties and is adapted to absorb the thrust of the propeller 5, and other means than the stud 6' may be provided as a thrust member.

The outer bearing of the shaft 4 is constituted by a casing 17, a bearing block 15 in which the shaft 4 is rotatably carried, and two pairs of laminated springs 16 intermediate the block and the casing. The springs are comparatively weak so as to permit the propeller shaft to adapt its position to the unbalanced centrifugal forces and to rotate about the axis containing the effective centre of gravity.

In operation the torque from the crank shaft 1 is transmitted to the shaft 4 through the medium of the gearing 2, 3, the clutch means 10, 11 and the joint 6 without interfering with the rocking movement of the shaft which is free to assume any position about the centre of the joint 6 within practical limits, and the outer end of the shaft 4 is not interfered with by the springs 16.

Instead of laminated springs as shown any other resilient means as coiled springs, rubber blocks or the like, might be provided for supporting the outer bearing 15, and damping means might also be arranged for absorbing the shaking vibrations occurring when the propeller is started or running down. Laminated springs comprising several layers as shown at 16 involve the advantage of effecting such damping without requiring any special means therefor. All plates of laminated springs may be of equal length and have duplicate supports at all points of abutment so as to enable the springs to absorb forces acting in either direction, making them twice as efficient as normal springs having blades of graduated length.

The springs may also consist of bundles of comparatively thin bars or wires of equal length as shown in Figs. 3 and 4. Referring to these figures, identical parts are indicated by the same reference numerals as in Figs. 1 and 2. 21 is a circular extension or disc formed on the outer bearing 15, 22 being bundles of wires, resilient bars or the like inserted in holes of the disc 21, 25 being a casing surrounding the shaft 4 at a suitable clearance, and 23, 24 being recesses in the end walls of the casing 25 for the reception of the bundles 22. The recesses 23, 24 secure the bundles so as to prevent the wires or bars from changing their relative position in the bundle radially but permit slight relative axial displacement. The holes in the disc 21 are preferably beveled at their outer ends so that the bundles 22 are engaged substantially only in the central plane of the bearing 15. Springs of this type are able to absorb forces in any direction so that all springs will partake in the absorption of centrifugal forces when the shaft 4 is displaced from its normal position. The material of the springs is consequently utilized to best advantage and their weight is reduced in proportion.

Instead of a reduction gearing 2, 3 as shown, the propeller shaft 4 might be connected with the crank shaft 1 directly through the medium of a universal joint, for instance a Cardan joint, not shown, and intermediate shafts, not shown, might be provided between the shaft 4 and its driving means, such intermediate shafting being supported in rigid bearings and connected with one end of the shaft 4 by universal joints or similar means.

I wish it to be understood that I do not desire to be limited to the exact details of construction shown and described for obvious modifications will occur to a person skilled in the art.

I claim:

1. Propeller shaft support comprising a shaft, a propeller at one, a universal coupling at the other end of said shaft, driving means connected with said shaft by said universal coupling and resilient means supporting the propeller end of said shaft for yielding radial motion in all directions.

2. Propeller shaft support comprising a shaft, a propeller at one, a universal coupling at the other end of said shaft, driving means connected with said shaft by said universal coupling and resilient means supporting the propeller end of said shaft for yielding radial motion in all directions about the centre point of said coupling.

3. Propeller shaft support comprising a shaft, a propeller on the outer end of said shaft, driving means near the inner end of said shaft, a universal coupling connecting said shaft and driving means, a casing surrounding the outer end of said shaft, a bearing in said casing supporting said shaft and spaced from the inner walls of said casing, resilient means interposed between said bearing and said casing to hold said bearing substantially in the centre of said casing and means near the inner end of said shaft for imparting rotation thereto.

4. Propeller shaft support comprising a shaft, a propeller on the outer end of said shaft, a bearing near the inner end of said shaft, driving means near the inner end of said shaft, a universal coupling operatively connecting said shaft with said driving means and permitting said shaft to rock in all directions about a centre point, a bearing near the outer end of said shaft, a casing surrounding said outer bearing and springs inserted between said outer bearing and said casing, and normally holding said bearing substantially in the centre of said casing, but permitting radial displacement of said bearing in all directions.

5. Propeller shaft support comprising a propeller shaft, a propeller on the outer end of said propeller shaft, a bearing near the inner end of said propeller shaft, a hollow driving shaft supported in said bearing, coupling means in said driving shaft, the inner end of said propeller shaft extending into said driving shaft and being operatively connected with said coupling means, means for centering said inner end in said driving shaft, while allowing said propeller shaft to rock about said centering means, a bearing near the outer end of said shaft, a casing surrounding said outer bearing and springs inserted between said outer bearing and said casing and normally holding said bearing substantially in the centre of said casing, but permitting radial displacement of said bearing in all directions.

6. Propeller shaft support comprising a shaft, a propeller on the outer end of said shaft, a bearing near the inner end of said shaft, driving means near the inner end of said shaft, a universal coupling at said inner end operatively connected with said driving means and permitting said shaft to rock in all directions about the centre point of said coupling, a resiliently mounted bearing near the outer end of said shaft arranged to permit radial displacement of said shaft in all directions and damping means forming part of said resiliently mounted bearing.

7. Propeller shaft support comprising a shaft, a propeller on the outer end of said shaft, a bearing near the inner end of said shaft, driving means near said inner end of said shaft, a universal coupling at said inner end operatively connected with said driving means and permitting said shaft to rock in all directions about the centre point of said coupling, a bearing near the outer end of said shaft, a casing surrounding said outer bearing, springs each comprising a plurality of resilient bars of substantially equal length, inserted between said outer bearing and said casing and normally holding said bearing substantially in the centre of said casing, but permitting radial displacement of said bearing in all directions, and means near the inner end of said shaft for imparting rotation thereto.

In testimony whereof I affix my signature.

OTTO MADER.